United States Patent [19]

Allison

[11] 4,028,784
[45] June 14, 1977

[54] PRELOADED TIE ROD END ASSEMBLY

[75] Inventor: William D. Allison, Grosse Pointe Farms, Mich.

[73] Assignee: Ford Motor Company, Dearborn, Mich.

[22] Filed: Apr. 12, 1976

[21] Appl. No.: 675,655

Related U.S. Application Data

[62] Division of Ser. No. 593,808, July 7, 1975.

[52] U.S. Cl. .................... 29/149.5 B; 29/148.4 R; 403/135
[51] Int. Cl.² ......................... B21D 53/10
[58] Field of Search ............ 29/148.4 A, 149.5 B, 29/149.5 DP, 149.5 C, 149.5 R

[56] References Cited

UNITED STATES PATENTS

| | | | |
|---|---|---|---|
| 2,503,533 | 4/1950 | Williams | 29/149.5 C |
| 2,758,365 | 8/1956 | Ricefield | 29/149.5 B |
| 3,179,477 | 4/1965 | Carter | 29/149.5 B X |
| 3,225,420 | 12/1965 | Sullivan, Jr. | 29/149.5 B |

Primary Examiner—C.W. Lanham
Assistant Examiner—V. K. Rising
Attorney, Agent, or Firm—Clifford L. Sadler; Keith L. Zerschling

[57] ABSTRACT

A preloaded tie rod end assembly for a motor vehicle steering system and the method for making the assembly is disclosed. The tie rod end is made by positioning first and second frangible bearings against the ball of a ball stud and enclosing the ball and bearings in first and second housings each of which has a socket part and a stem part. A plastically deformable element is also situated within the socket formed by the two socket parts. The two housings are held together under a compressive load while their abutting edges are butt welded. The imposition of this load during the welding operation causes the frangible bearings to each fracture into a plurality of self-aligning bearing pieces. The deformable element is plastically deformed by exerting a force on the ball stud whereby a portion of the preload of the joint is relieved. The preload is relieved to the extent necessary to bring the frictional resistance to rotation of the ball stud within a prescribed torque range.

4 Claims, 5 Drawing Figures

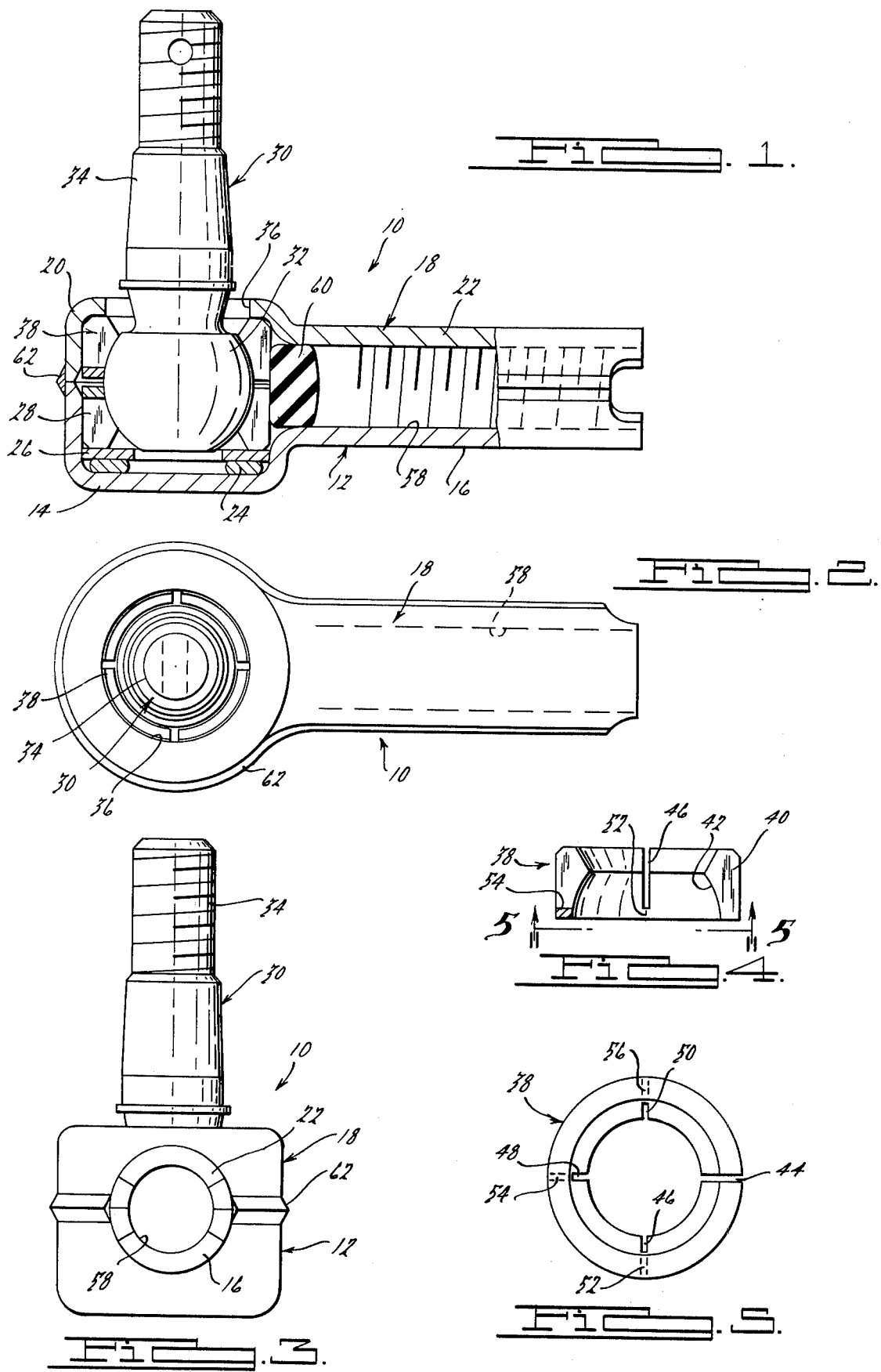

PRELOADED TIE ROD END ASSEMBLY

This is a division of application Ser No. 593,808, filed July 7, 1975.

BACKGROUND OF THE DISCLOSURE

In order to provide a steering linkage system for a motor vehicle that operates in an optimum manner, it is necessary to have tie rod end assemblies each of which has a frictional resistance to joint movement that is within prescribed operating limits. Frictional resistance that is either above or below the desired range may exhibit undesirable effects.

While the steering will function for its intended purpose of transmitting a steering force from the steering wheel to the steerable road wheels, the vehicle operator may find that the steering does not have a desired precision "feel" or that excessive vibration and harshness may be transmitted from the road wheels through the linkage to the steering wheel.

The present invention provides a preloaded tie rod end assembly for a motor vehicle steering linkage system that is characterized by its unique construction and method of manufacture which permits precise control of the preload of the joint while being relatively inexpensive to fabricate.

BRIEF SUMMARY OF THE DISCLOSURE

In the presently preferred form of a preloaded tie rod end assembly according to this invention, first and second housing parts each have a socket portion and a stem portion. A plastically deformable lead washer is fitted in the socket portion of the first housing. A first annular frangible bearing is positioned in the same socket part with the ball of a ball stud in engagement with the bearing. A second bearing engages the ball and the second housing has its socket part enclosing the second bearing.

The first and second housing parts have abutting edges and the parts are secured together by butt welding the edges at the same time while a compressive load is imposed upon the two housing parts. The compression causes each of the bearings to each fracture into a plurality of circumferentially spaced apart bearing pieces. At this point in the manufacturing operation after the welding step is completed, the joint has a preload that exceeds a predetermined desired amount. An axial force is then exerted on the ball stud causing the deformable element to plastically deform and this deformation relieves a portion of the preload. The element is deformed by an amount necessary to bring the frictional resistance to rotation of the ball stud within the desired predetermined range.

BRIEF DESCRIPTION OF THE DRAWINGS

The many objects and advantages of a preloaded tie rod end assembly that is made in accordance with this invention will become apparent upon consideration of the following detailed description and the accompanying drawings, in which:

FIG. 1 is a side view in section of a new tie rod end construction;

FIG. 2 is a top plan view of the tie rod end of FIG. 1;

FIG. 3 is an end elevational view of the stem end of the tie rod end;

FIG. 4 is a sectional view of one of the bearing means of the tie rod end; and

FIG. 5 is a bottom plan view of the bearing of FIG. 4 taken in the direction of arrows 5—5.

DETAILED DESCRIPTION OF A PREFERRED EMBODIMENT

Referring now to the drawings wherein the presently preferred embodiment of this invention is illustrated, FIG. 1 shows the construction of a preloaded tie rod end assembly 10. The tie rod end 10 has a lower housing 12 with a socket part 14 and a stem part 16 and an upper housing 18 with a socket part 20 and a stem part 22.

A lead washer 24 is positioned at the base of the socket part 14. A steel washer 26 is fitted on top of the lead washer 24. A lower frangible bearing 28 rests on the steel washer 26.

A ball stud 30 has a ball portion 32 that rests on the bearing 28. The shank 34 of the stud 30 extends upwardly through an opening 36 in the upper socket part 20. An upper bearing 38 is fitted in the upper socket part 20 in engagement with the ball 32.

The bearings 28 and 38 are of identical construction. Referring to FIGS. 4 and 5, the configuration of the bearing 38 is shown prior to its installation into the upper socket part 20. Bearing 38 is generally annular with a cylindrical outer surface 40 and a partially spherical inner bearing surface 42 for slidable engagement with the ball 32. The bearing 38 is provided with a series of equally spaced apart slots 44, 46, 48 and 50. These slots divide the bearing into four bearing segments. Slot 44 extends completely through the bearing material whereas slots 46, 48 and 50 extend only partially through the material so that tie bars 52, 54 and 56 are provided to interconnect the four segments of the bearing 38.

The bearing 38 is molded of powdered bronze and is frangible. The tie bars 52, 54 and 56 holding the bearing segments together are easily fractured under a load as will become apparent.

The stem portions 16 and 22 of the housing parts 12 and 18 combine to form a hollow stem that is internally threaded at 58 for attachment to an element of a steering linkage system. A rubber plug 60 is situated at the inner end of the hollow stem and functions as a seal to retain lubricant within the joint 10. A boot seal (not shown) may be provided in sealed engagement with the ball stud shank 34 and upper housing 20 in order to close the opening 36 and prevent the entry of contaminants into the interior of the tie rod end 10.

METHOD OF MANUFACTURE

The preloaded tie rod end assembly 10 is manufactured by forming the upper and lower housing parts 12 and 18 as illustrated. The lead and steel washers 24 and 26 together with the lower bearing 28 are positioned in the socket part 14 of the lower housing 12. The ball 32 is positioned against the bearing 28, the second bearing 38 is positioned against the ball 32 and finally the upper housing part 18 is placed with its socket part 20 over the bearing 38 and its stem portion 22 over stem portion 16 of the lower housing 12.

The housing parts 12 and 18 have peripheral edges that are positioned in abutting relationship. The housing parts 12 and 18 are compressed together at the same time the seam formed by the abutting edges of the housing parts is butt welded. It will be noted from the drawings that the welded seam 62 bulges outward as a result of the compressive load. This load is transmitted to the upper and lower bearings 28 and 38 causing their tie bars to fracture. As a result, each of the bearings 28 and 38 becomes a series of circumferentially spaced apart bearing elements and these bearing elements align themselves with respect to the upper and lower socket parts 14 and 20 and with respect to the ball 32. Due to the self-aligning feature, close tolerance control in the manufacture of the upper and lower housings 12 and 18 and of the ball 32 is not required.

The welding of the seams 62 while the housings 12 and 18 are under compression, in addition to fracturing the bearings 28 and 38, will impose a preload that exceeds the amount desired for the finished joint. That is, the torque required to overcome the frictional resistance to rotation of the stud 30 about its own axis or to pivot the stud about the center of the ball 32 will be greater than a desired predetermined amount. In order to reduce the preload so that it falls within the desired range, an axial force in the downward direction is exerted on the stud 30. The load imposed on the stud 30 is sufficiently great to cause partial plastic deformation of the lead washer 24. The axial load is imposed in increments and the frictional resistance to rotation of the ball stud 30 is noted between each increment. Plastic deformation of the washer 24 will relieve a portion of the preload of the joint and the axial force on the stud 30 is applied to the extent necessary to bring the frictional resistance to rotation of the stud into the desired torque range. For a typical vehicle steering application that range would be about 8 to 15 inch pounds.

The interior of the stem of the tie rod 10 is threaded at 58 to accommodate attachment to a steering linkage element. As also shown, the shank 34 of the stud 30 is constructed to be connected to another element of a steering system. The assembly or manufacture of the tie rod end 10 is completed by inserting the rubber plug 60 and placing lubricant within the socket parts 12 and 14. Finally, a boot seal (not shown) is positioned over the shank 38 in engagement with the upper socket part 20.

SUMMARY

The preloaded tie rod end assembly of this invention is characterized by its simplicity of construction and each of manufacture. The method by which the preload is established assures a finished joint having frictional resistance to movement within the desired specified range. In addition, the self-aligning construction of the bearings permits the use of stamped housing parts not requiring close tolerances.

The foregoing description presents the presently preferred embodiment of this invention. Modifications and alterations may occur to those skilled in the art that will come within the scope and spirit of the following claims.

I claim:
1. A method of making a preloaded tie rod end assembly comprising:
   forming a first housing and a second housing each with a socket part and a stem part;
   assembling a one-piece frangible bearing and the ball of a ball stud between said socket parts of said first and said second housings;
   exerting a load on said first and second housings causing said bearing to fracture into a plurality of bearing elements;
   securing said first and second housings together by welding while maintaining said load on said bearing.
2. A method of making a preloaded tie rod end assembly comprising:
   forming a first housing and a second housing each with a socket part and a stem part;
   assembling a first one-piece frangible bearing, the ball of a ball stud and a second one-piece frangible bearing between said socket parts of said first and second housings with the peripheral edge of said first housing in abutting relationship to the peripheral edge of said second housing;
   exerting a load on said first and second housings causing each of said frangible bearings to fracture into a plurality of bearing elements;
   welding said edges of said first and second housings together while maintaining said load on said first and second bearings.
3. A method of making a preloaded tie rod end assembly according to claim 2 and including:
   assembling a plastically deformable element between said first socket part and said second socket part;
   exerting an axial load on said ball stud causing said deformable element to deform whereby the frictional resistance to rotation of said ball stud is reduced;
   deforming said deformable element by an amount that provides a frictional resistance to rotation of said ball stud that is within a prescribed torque range.
4. A method of making a preloaded tie rod end assembly comprising:
   forming a first housing and a second housing each with a socket part and a stem part;
   assembling a bearing means, the ball of a ball stud, and a plastically deformable element between said socket parts of said first and second housings with the peripheral edge of said first housing in abutting relationship to the peripheral edge of said second housing;
   exerting a compressive load on said first and second housings that provides a preload between said bearing means and said ball that is above a predetermined minimum;
   welding said abutting edges of said first and second housings together while maintaining said compressive load on said housings;
   exerting an axial load on said ball stud causing said deformable element to deform whereby said preload is reduced;
   deforming said deformable element by an amount that brings said preload within a prescribed torque range.

* * * * *